Patented Mar. 27, 1945

2,372,233

UNITED STATES PATENT OFFICE 2,372,233

PURIFICATION OF FLUID MEDIA

Jack T. Thurston, Riverside, Conn., assignor to American Cyanamid Company, New York, N. Y., a corporation of Maine No Drawing. Application August 1, 1942, Serial No. 453,276

7 Claims. (Cl. 23—1)

This invention relates to the removal of cations from fluid media, to the exchange of cations in fluid media and to the purification of fluid media.

An object of this invention is to provide a process for removing cations from fluid media.

Another object of my invention is to purify fluid media and, more particularly, aqueous media containing undesired cations.

These and other objects are attained by contacting the fluid to be treated with a material obtained by resinifying a furyl substituted organic sulfonate by reaction with at least one aldehyde and preferably with furfural or a mixture of furfural and one or more other aldehydes. One method for preparing sulfonates of the aforementioned type is by condensing furfural with a substance containing an active methyl group or an active methylene group and converting the resulting condensation product into a sulfonate, for example, by reaction with a bisulfite. The term "sulfonate" as used herein includes the hydrogen sulfonate (or, in other words, the sulfonic acid) as well as the metal, ammonia or amine salts thereof.

The following examples in which the proportions are in parts by weight are given by way of illustration and not in limitation. Except as otherwise indicated, the formalin is an aqueous solution containing 37% formaldehyde, the hydrochloric acid is an aqueous solution containing 37% HCl and the furfural is about 95% pure.

EXAMPLE 1

A cylinder or other vessel is filled with a granular cation active material prepared in accordance with one or more of the examples set forth below. Through this bed of resin a dilute acid solution, e. g., 0.2–10% sulfuric acid is passed and the resin is activated after which it is washed with water to remove residual acid. This bed of resin is now in the so-called hydrogen activated state and is suitable for removing cations from fluid media such as water.

Water containing cations in the form of a base or salt is passed through the bed of resin. If the water contains only bases the effluent will be substantially neutral and free of cations until the capacity of the bed of resin is approached. If the water contains salt the effluent will be acidic and for most purposes it will be desirable to pass the effluent through a bed of anion active resin to remove the acid. In most purification processes, particularly if the salt content of the fluid to be treated be high, it will be necessary or desirable to employ a plurality of cation active beds with an anion active bed between each of the cation active beds. Thus, water containing about 50 P. P. M. of total solids including 37 P. P. M. of non-volatile solids may be passed through a bed of one of my cation active resins. If this water be passed through about 2 cubic feet of the resin described in Example 5 which is packed into a column which is about 10 inches in diameter, at a rate of about 1½ gal. per minute, the effluent contains only about 21 P. P. M. total solids and has a pH of about 4.5. The acidity of the effluent may be removed by passing it through an anion active resin, and the water may be still further purified by passing it through another bed of cation active material after which it can be aerated to remove carbon dioxide or further treated with additional beds of anion and cation active materials.

EXAMPLE 2

About 10 liters of an aqueous solution containing 50% of crude cane sugar which is dark brown in color, quite turbid and has a pH of about 6.5 is heated to about 65° C. The solution may be subjected to a preliminary filtration if desired and passed through about 1 liter of a cation active material prepared in accordance with my invention, for example, the resin prepared according to Example 5. The volume of resin employed may be about 1 liter of resin packed into a column about 2 inches in diameter. The pH of the effluent from the cation active material is about 1.5 thereby indicating that cations have been removed with consequent release of free acid. The effluent may be passed through an anion active resin to remove the acid and other anions which may be present and this may be followed by further treatments with cation and anion active resins, or it may be followed by treatment with bone black or any of the other purification methods employed in sugar refining. Finally the sugar may be crystallized from the purified sugar solution to produce a crystalline sugar of extremely high purity and brilliance characteristic of high grade sugar. Furthermore, if molasses be produced as a by-product from this sugar, it is a high quality product having a light color and a very low content of salts as impurities.

Other aqueous solutions containing cations may be purified in the same general manner as described in the preceding examples. Furthermore, other fluid media containing cations may be purified in the same general manner. The following examples illustrate the cation active materials which are suitable for use in my purification process as well as processes for preparing such materials.

EXAMPLE 3

Preparation of potassium 1-alpha-furyl-3-ketobutane sulfonate

| | Parts |
|---|---|
| Furfurylidene acetone | 136 |
| Potassium metabisulfite | 113 |
| Water | 150 |

These substances are placed in a reaction vessel provided with a mechanical agitator and a reflux condenser and the mixture is heated to boiling. A homogeneous solution is obtained in about 20 minutes and it is refluxed for about 6 hours. The solvent is distilled under reduced pressure (e. g., 25 mm. of mercury absolute pressure) leaving as a residue a white solid which is washed with ethanol and filtered. The solid is suspended in boiling ethanol and water is added slowly until the former is completely dissolved. Decolorizing charcoal is added to the hot solution, which is filtered and the colored filtrate permitted to cool during which time a white crystalline solid deposits. This white crystalline material is filtered, washed with ethanol and dried. A yield of about 62% of the theoretical yield is obtained. The melting point of the product is about 212–213° C. and a recrystallized sample gives the following analysis:

| | Per cent C | Per cent H | Per cent S |
|---|---|---|---|
| Calcd. for $C_8H_9O_4SK$ | 37.49 | 3.51 | 12.50 |
| Obtained | 37.25 | 3.59 | 12.75 |
| | 37.26 | 3.85 | 12.61 |

Preparation of resin

| | Parts |
|---|---|
| Potassium 1-alpha-furyl-3-ketobutane-sulfonate | 103 |
| Water | 100 |
| Furfural | 77 |
| Hydrochloric acid | 24 |

A solution of the sulfonate in the water is prepared by warming them together and cooling to about 25° C. To this solution the furfural is added thereby producing a straw-colored solution. The hydrochloric acid is added thereby causing the solution to darken becoming first red, then violet and finally black. This solution is allowed to stand for from several hours up to about 12 hours, during which time a firm, black rubbery gel is formed. This gel is chopped into particles of relatively small size, spread on trays and cured for about 4 hours at around 100° C. The product is an extremely hard, black solid resembling coal in appearance. The material is quite heat resistant and carbonizes only slowly when placed on a hot plate for 4 hours. The product is ground and screened so that the bulk of the material passes through a 24 mesh screen but remains on a 30 mesh screen. The final product exhibits a capacity for the absorption or exchange of cations from water equivalent to about 12,200 grains of calcium carbonate per cubic foot of resin and the density of the material is about 29 pounds per cubic foot.

EXAMPLE 4

Preparation of furfurylacetone sulfonate

| | Parts |
|---|---|
| Crude furfurylidene acetone | 544 |
| Potassium metabisulfite | 444 |
| Water | 600 |

These substances are heated boiling after being placed in a reaction vessel equipped with a mechanical stirrer and a reflux condenser. The reacting mixture is refluxed for about 16 hours. Sufficient ethanol is added to the resulting solution to precipitate the white solid product which is filtered and crystallized twice from aqueous ethanol. A yield of about 338 parts of sulfonate is obtained.

Preparation of resin

| | Parts |
|---|---|
| Furfurylacetone sulfonate (0.5 mol.) | 128 |
| Water | 175 |
| Furfural (0.625 mol.) | 55 |
| Hydrochloric acid | 15 |

A resin is prepared from these substances in the same manner as described in Example 1. A soft rubbery gel is formed a few hours after the addition of the hydrochloric acid. The gel is broken up into small particles, spread on a tray, placed in an oven and cured, maintaining the temperature at 50° C. for around 18 hours and at around 100° C. for an additional 4 hours. The resin is ground and screened in the usual manner (as described in Example 1). The final product has a capacity for the absorption of cations from water calculated to about 18,400 grains of calcium carbonate per cubic foot of resin and the packed density of the material is about 24.1 pounds per cubic foot.

EXAMPLE 5

Preparation of crude furfurylacetone sulfonate

| | Parts |
|---|---|
| Crude furfurylidene acetone | 2,075 |
| Sodium bisulfite | 1,664 |
| Water | 5,000 |

These substances are placed in a reaction vessel provided with a mechanical agitator and a reflux condenser. The vessel may be heated by any convenient means such as by means of a steam jacket. A homogenous solution is obtained after about 30–40 minutes of heating. After an additional ½ hour of heating the solution is treated with decolorizing charcoal and filtered while hot. The filtrate is a clear brown colored solution containing about 45% of solids which are essentially sodium furfurylacetone sulfonate.

Preparation of resin

| | Parts |
|---|---|
| Crude furfurylacetone sulfonate solution (1 mol) | 529 |
| Furfural (2 mols) | 202 |
| Hydrochloric acid | 12 |

The crude furfurylacetone sulfonate solution used in the above formulation is that prepared in accordance with the procedure in the preceding section of this example. To this solution the hydrochloric acid is added and after thoroughly mixing, the furfural is added. The resulting solution immediately darkens and a soft gel is formed after around 2 days time. The gel is permitted to age for about 5 days after which time it is quite hard. The hard gel is ground in small pieces, spread on trays and cured in an oven maintained at about 50° C. for about 15 hours and at around 100° C. for an additional 5 hours. The cured resin is ground and screened in the usual manner thereby producing a material which has a capacity for the exchange of cations equivalent to about 17,300 grains of calcium carbonate per cubic foot of resin and a

Example 6

Preparation of resin

| | Parts |
|---|---|
| Furfurylacetone sulfonate | 120 |
| Water | 150 |
| Formalin (1 mol) | 81 |
| Furfural (0.75 mol) | 76 |
| Hydrochloric acid | 35 |

The furfurylacetone sulfonate is prepared in accordance with Example 2. It is dissolved in the water and formalin after which the furfural is added. When the solution becomes homogeneous, the hydrochloric acid is added after which the solution darkens slowly. After about 3 days a soft gel is formed and this is chopped up into small pieces, placed on a tray and cured at a temperature of around 50° C. for about 3 hours followed by an additional 16 hours at approximately 100° C. The resin is ground and screened in the usual manner thereby producing a material having a capacity for the exchange of cations equivalent to 21,900 grains of calcium carbonate per cubic foot of resin. The packed density of the resin is about 29.4 pounds per cubic foot.

Example 7

About 570 parts of water and about 2.45 parts of sodium hydroxide (97%) are agitated in a kettle by means of a mechanical agitator to form a solution having a pH of about 11.8. A mixture of about 104.4 parts of acetone and 181 parts of furfural is added slowly over a period of about 1 hour, during which time the temperature is maintained at about room temperature and the reacting mixture is agitated. The reacting mixture is stirred for an additional hour, after which a solution of about 3.06 parts of sulfuric acid (95.5%) and 3.06 parts of water is added to bring the pH to about 7. About 187.2 parts of sodium bisulfite are added and the reaction mixture is heated to about 95° C. over a period of about 30 minutes. An exothermic reaction occurs and causes the temperature to rise to 100° C. After the exothermic reaction subsides the reacting mixture becomes clear and it is refluxed for about ½ hour. The product is cooled to about 50° C. and a solution of 122.4 parts of sulfuric acid and 194 parts of water are added, followed by the addition of 271.8 parts of furfural. The reacting mixture is agitated for about 70 minutes during which time the temperature is maintained at about 50–55° C. The resulting solution is discharged into molds where after about 40 minutes it gels. The gel is aged about 16–18 hours and granulated to pass through an 8 mesh screen. The granulated resin is spread on trays and placed in an oven maintained at 50° C. for about 2–4 hours, raised to about 100–135° C. over a period of about 1 hour and maintained at about 100–135° C. for about 4–9 hours. The product has a capacity for the absorption of cations equivalent to about 17,000 grains of calcium carbonate per cubic foot of resin and a packed density of about 24–27 pounds per cubic foot.

Example 8

| | Parts |
|---|---|
| Crude furfurylacetone sulfonate solution (1 mol) | 513.3 |
| Furfural (1.5 mols) | 151.5 |
| Sulfuric acid (41.5%) | 79 |

The sulfonate solution is prepared in accordance with Example 3 and it contains about 46.8% of the sulfonate. The sulfuric acid is mixed with the sulfonate in a reaction vessel provided with an agitator. The reaction vessel is preferably surrounded by a jacket through which a heat exchange medium may be circulated in order to maintain the temperature of the contents of the reaction vessel constant. The temperature is maintained at about 30° C. in this example. The furfural is added to the solution in the reaction vessel after adjusting its temperature to about 30° C. The reacting mixture is agitated for about 20 minutes after which the resulting solution is maintained at about 30° C. either in the reaction vessel or in other convenient vessels until gelation occurs. The gel forms in about 16.6 hours after which it is aged at room temperature for about 16–24 hours. The gel is ground, spread on trays, dried and cured for about 4 hours at 50° C. and for about 4 hours at 100° C. The cured resin is further processed in the usual manner and it has a density of about 29.5 pounds per cubic foot and a capacity of about 16,600 grains of calcium carbonate per cubic foot of resin.

Example 9

Example 8 is repeated except that 119 parts of sulfuric acid are used instead of 79 parts of sulfuric acid. The final product has a packed density of about 33.5 pounds per cubic foot and a capacity of about 10,200 grains of calcium carbonate per cubic foot of resin.

Example 10

Example 8 is repeated except that about 35 parts of hydrochloric acid are used in place of the sulfuric acid. The final product has a capacity of about 18,800 grains of calcium carbonate per cubic foot of resin and a packed density of about 24.5 pounds per cubic foot.

Example 11

Example 8 is repeated except that about 172 parts of sulfuric acid are used in place of 79 parts of sulfuric acid. The final product has a capacity of about 10,200 grains of calcium carbonate per cubic foot of resin and a packed density of about 41 pounds per cubic foot.

Example 12

| | Parts |
|---|---|
| Crude furfurylacetone sulfonate solution | 308 |
| Water | 195 |
| Furfural | 90.9 |
| Sulfuric acid | 103.2 |

The water and sulfuric acid are mixed with the sulfonate solution, the furfural added and the reaction carried out in accordance with Example 6. The final product has a capacity of about 8,400 grains of calcium carbonate per cubic foot of resin and a density of about 31.1 pounds per cubic foot.

Example 13

Example 11 is repeated except that the reaction is carried out at 50° C. instead of 30° C. The final product has a capacity of about 12,400 grains of calcium carbonate per cubic foot of resin and the density is about 33 pounds per cubic foot.

Example 14

Example 9 is repeated except that the reaction is carried out at constant temperature of 50° C.

instead of 30° C. The final product has a capacity of about 13,500 grains of calcium carbonate per cubic foot of resin and a density of about 28.6 pounds per cubic foot.

EXAMPLE 15

Example 8 is repeated except that the reaction is carried out at a constant temperature of about 50° C. instead of 30° C. The final product has a capacity of about 16,700 grains of calcium carbonate per cubic foot of resin and a density of about 21 pounds per cubic foot.

EXAMPLE 16

Resins are prepared following the general procedure of Examples 8–15. The following table shows the effect of varying amounts of water and sulfuric acid in the reaction mixture. In each case the molal ratio of the sulfonate to the furfural is 1:1.5.

*Gel formation time*

FURFURAL-FURFURYLACETONE SULFONATE RESINS

| $H_2SO_4$ equivs.[1] per mol of furfural | $H_2O$, per cent | A<br>Minutes to gel at 30° C. | B<br>Minutes to gel at 50° C. | Ratio B/A |
|---|---|---|---|---|
| 1.0 | 44 | 376 | 75 | 0.199 |
| 1.0 | 54 | 716 | 156 | 0.218 |
| 1.0 | 60 | 1,130 | 227 | 0.201 |
| 0.69 | 44 | 580 | 115 | 0.200 |
| 0.46 | 41 | 1,006 | 204 | 0.203 |
| 0.23 | 42 | 2,034 | | |

[1] The mols of sulfuric acid would be half the values given in this column.

EXAMPLE 17

| | Parts |
|---|---|
| Furfurylacetone sulfonate (0.3 mol) | 72 |
| Water | 125 |
| Ferric sulfate | 51 |
| Furfural (0.45 mol) | 46 |

The furfurylacetone sulfonate is prepared in accordance with the procedure set forth in Example 3. The sulfonate is dissolved in the water and the ferric sulfate is added. The resulting mixture is warmed to give a complete solution which has a pH of about 0.5–0.6. The solution is heated to about 75° C. In a suitable apparatus provided with an agitator and the furfural is added, thereby causing the solution to darken. The reacting solution is agitated for ½–1 hour. The resulting solution is allowed to stand for about 3 days during which time a soft rubbery gel is formed. The gel is granulated, spread on trays, dried and cured for about 4 hours at 50° C. followed by an additional 4 hours at around 100° C. The capacity of the final product after grinding and screening in the usual manner is equivalent to about 15,200 grains of calcium carbonate per cubic foot of resin and the packed density is about 19.8 pounds per cubic foot.

EXAMPLE 18

| | Parts |
|---|---|
| Furfurylacetone sulfonate (0.6 mol) | 144 |
| Water | 250 |
| Ferric chloride (hexahydrate) (0.3 mol) | 82 |
| Furfural (0.9 mol) | 91 |

The furfurylacetone sulfonate is prepared in accordance with Example 5. The sulfonate is dissolved in the water and the ferric chloride is dissolved in the resulting solution. After the ferric chloride is dissolved, the pH of the solution is about 0.7. The solution is heated to about 70–80° C. and agitated during the addition of the furfural and for an additional period of time of about ½–1 hour. The solution thus obtained is allowed to stand at about room temperature for 3 days during which time a firm gel forms. The gel is granulated, dried, cured and further processed in accordance with Example 17. The capacity of the final product for the absorption of cations from water is equivalent to about 18,100 grains of calcium carbonate per cubic foot of resin and has a density of about 32.2 pounds per cubic foot.

EXAMPLE 19

| | Parts |
|---|---|
| Furfurylacetone sulfonate (0.6 mol) | 144 |
| Water | 250 |
| Furfural (0.9 mol) | 91 |
| Boron fluoride in diethyl ether (45%) (0.3 mol) | 46 |

The sulfonate is dissolved in the water in a suitable reaction vessel provided with an agitator. The furfural is added and the solution is warmed to about 40° C. The boron fluoride solution is added slowly over a period of about 5–10 minutes. The ether is allowed to distill from the reaction mixture after which the reacting solution is heated to about 70° C. and agitated for about ½–1 hour. The resulting solution is allowed to stand at about room temperature for about 2 days by the end of which time a soft gel is formed. The gel is aged for an additional day, granulated, dried, cured and further processed in accordance with Example 17. The final product has a capacity for the extraction of cations from fluid media equivalent to about 17,700 grains of calcium carbonate per cubic foot of resin and a packed density of about 21 pounds per cubic foot.

EXAMPLE 20

| | Parts |
|---|---|
| Furfurylacetone sulfonate (0.6 mol) | 144 |
| Water | 180 |
| Formalin (1.2 mols) | 98 |
| Furfural (0.9 mol) | 91 |
| Triethanolamine solution (50% in water) | 5 |
| Hydrochloric acid | 21 |

The sulfonate is prepared in accordance with Example 5. The formalin in which the triethanolamine is dissolved is added to a solution of the sulfonate in the water. The resulting mixture is heated in a suitable reaction vessel provided with an agitator to about 90° C. during which time it becomes quite dark. The resulting solution is cooled to room temperature and the furfural is added. The acid is added and the resulting mixture heated to about 60° C. when a clear solution is obtained. The solution is very dark in color at this stage. The solution is agitated for about ½–1 hour and allowed to stand for about 2 days at room temperature during which time a soft rubbery gel forms. The gel is aged for an additional day, after which it becomes quite firm. The gel is granulated, dried, cured and further processed as described in Example 17. The final product has a density of 15.6 pounds per cubic foot and it exhibits a capacity for the absorption of cations from water equivalent to 21,500 grains of calcium carbonate per cubic foot of resin.

Example 21

*Preparation of disodium 1,5-di-alpha-furyl-3-ketopentane disulfonate-1,5*

| | Parts |
|---|---|
| Difurfurylidene acetone | 86 |
| Sodium bisulfite | 83 |
| Water | 116 |

These substances are heated to boiling and refluxed in a suitable apparatus for about 16 hours. The resulting solution is treated with decolorizing charcoal and filtered. The product is precipitated from the filtrate by addition of the ethanol. A yield of about 84% is obtained. For convenience this product will be designated as difurfuryl acetone disulfonate. The product does not melt at temperatures up to about 250° C.

*Preparation of resin*

| | Parts |
|---|---|
| Difurfuryl acetone disulfonate (0.5 mol) | 227 |
| Furfural (1 mol) | 101 |
| Water | 250 |
| Hydrochloric acid | 47 |

The disulfonate, water and hydrochloric acid are mixed together in a reaction vessel provided with an agitator and heated to about 60° C. until a homogeneous solution is obtained. The furfural is added after which a gel forms in about 15 minutes. The gel is ground into small pieces, spread on trays and cured for about 4 hours at about 50° C. followed by an additional 4 hours at around 100° C. After the resulting resin is ground and screened in the usual manner, the final product has a packed density of about 25.4 pounds per cubic foot and it shows a capacity for the extraction of cations from water equivalent to about 19,800 grains of calcium carbonate per cubic foot of resin.

Example 22

*Preparation of disodium 1,5-di-alpha-furyl-3-ketopentane disulfonate-1,5 solution*

| | Parts |
|---|---|
| Furfural (24 mols) | 2,424 |
| Sodium hydroxide (3.6 mols) | 144 |
| Acetone (12 mols) | 696 |
| Water | 12,432 |
| Sodium bisulfite | 2,880 |

The furfural is added to a solution of the sodium hydroxide, acetone and water and the resulting mixture is agitated for about 2 hours. After standing an additional 14 hours, the difurfurylidene acetone separates as a solid mass in the bottom of the vessel. The mixture is heated sufficiently to melt the solid and then it is neutralized with 10% sulfuric acid. The sodium bisulfite is added and the reacting mixture is heated for about 2-3 hours. The resulting solution is treated with decolorizing charcoal and filtered. The filtrate contains about 29.6% solids and analysis indicates that it contains about 25% of the disulfonate. For convenience this solution will be designated as difurfuryl acetone disulfonate solution.

*Preparation of resin*

| | Parts |
|---|---|
| Difurfuryl acetone disulfonate solution (0.5 mol) | 712 |
| Furfural (1.25 mols) | 126 |
| Hydrochloric acid | 24 |

The hydrochloric acid is added to the disulfonate solution followed by the addition of the furfural. A soft gel is formed after about 3 days and it is ground into small particles, placed upon trays and cured for about 4 hours at about 50° C. followed by about 4 hours at around 100° C. The final product is ground and screened in the usual manner, after which the packed density is about 22.2 pounds per cubic foot and the capacity for the absorption of cations from water is equivalent to about 21,600 grains of calcium carbonate per cubic foot of resin.

Example 23

*Preparation of sodium 1-alpha-furyl-1(3-keto-3-phenylpropane) sulfonate*

| | Parts |
|---|---|
| Furfurylidene acetophenone (3 mols) | 594 |
| 95% sodium bisulfite (3.3 mols) | 360 |
| Water | 1,000 |

A mixture of these substances is heated in a reaction vessel provided with an agitator and heated by suitable means, such as, for example, a steam jacket. The temperature is brought to about 105° C. and after about 40 minutes a clear solution is obtained. The temperature is maintained at around 105° C. for an additional 30 minutes and then permitted to cool. The white crystals which deposit on cooling are filtered and washed with water, alcohol and acetone. The product thus obtained is a dihydrate of the sulfonate. It is dried at about 110° C. to produce a yield of 91% of the anhydrous sulfonate which has a melting point of about 231° C. For convenience this product will be designated as furfurylacetophenone sulfonate.

*Preparation of resin*

| | Parts |
|---|---|
| Furfurylacetophenone sulfonate (1 mol) | 302 |
| Furfural (1.5 mols) | 152 |
| Water | 600 |
| Hydrochloric acid | 71 |

The sulfonate is dissolved in the water by heating a mixture thereof to about 70° C. The furfural is added thereby causing the temperature to drop to around 65° C. The hydrochloric acid is added after which the color of the syrup becomes darker and after about 4 days a tough rubbery gel is formed. The resin is ground so that it will pass through an 8 mesh screen, spread on trays and cured for about 4 hours at 50° C. followed by an additional 16 hours at approximately 100° C. The resulting material is ground and screened as usual, after which the packed density is about 29 pounds per cubic foot and the capacity for the exchange of cations from water is equivalent to about 7,700 grains of calcium carbonate per cubic foot of resin.

Example 24

*Preparation of 2,6-bis-(alpha-furyl-potassiumsulfomethyl)-cyclohexanone*

| | Parts |
|---|---|
| Difurfurylidene-cyclohexanone (0.54 mol) | 137 |
| Potassium metabisulfite (0.54 mol) | 120 |
| Water | 280 |
| The monoethylether of ethylene glycol | 325 |

The difurfurylidene-cyclohexanone is prepared in accordance with the procedures outlined in Compt. rend. 174, 1469 (1923) and J. Pharm. Chim. 6, 204 (1927). The potassium metabisulfite is dissolved in the water to form a solution which is added to a suspension of the difurfurylidene-cyclohexanone in the monoethyl ether of ethylene glycol. The mixture is heated to boiling and refluxed for about 2½ hours. After about ½ hour of refluxing, the white solid begins to separate. At the conclusion of the refluxing operation the reaction mixture is cooled thereby causing a large mass of crystals to separate. The solid material is filtered, suspended in the monoethylene ether of ethylene glycol, filtered, washed with an additional quantity of said ether, washed with acetone and dried. An additional quantity of the product may be obtained by adding about 2 volumes of acetone to the ether filtrate thereby precipitating crystals which are filtered, washed and dried. The combined yield of the product is about 91% of the theoretical and it melts at about 250° C. For convenience this product will be designated as difurfurylcyclohexanone disulfonate. The product shows the following analysis:

|  | Per cent C | Per cent H | Per cent S |
|---|---|---|---|
| Calcd. for $C_{16}H_{16}O_9S_2K_2$ | 38.69 | 3.24 | 12.96 |
| Obtained | 38.69 | 3.35 | 13.15 |
|  | 38.61 | 3.34 | 13.07 |

*Preparation of resin*

| | Parts |
|---|---|
| Difurfurylcyclohexanone disulfonate (0.3 mol) | 148 |
| Water | 265 |
| Sulfuric acid (42.7%) | 103 |
| Furfural (0.9 mol) | 91 |

The disulfonate, water and acid are heated together to a temperature of about 70° C. to give a clear solution. The furfural is added and after standing overnight a firm gel forms. The gel is broken into small pieces, spread on trays and cured for about 4 hours at 50° C. and for an additional 4 hours at around 100° C. The cured gel is ground and screened as usual to produce a final product having a capacity for the exchange of cations equivalent to about 6,700 grains of calcium carbonate per cubic foot of resin and a packed density of about 30 pounds per cubic foot of resin.

EXAMPLE 25

*Preparation of furfurylidenemethyl ethyl ketone*

| | Parts |
|---|---|
| Methyl ethyl ketone (1 mol) | 72 |
| Furfural (1 mol) | 101 |
| Sodium hydroxide | 4 |
| Water | 400 |

The mixture of the methyl ethyl ketone and the water containing the sodium hydroxide dissolved therein is placed in a reaction vessel provided with a mechanical agitator. Sufficient ethanol is added to give a clear solution. The furfural is added very slowly over a period of about 20 minutes during which time an oily material begins to separate. After agitating for an additional hour the reaction mixture is acidified by the addition of 10% sulfuric acid, thereby causing the complete separation of the oily material. This material is decanted and distilled under reduced pressure yielding about 69% of the theoretical quantity of product boiling about 98° C. at 1 mm. of mercury Absolute Pressure. The product analyzes as follows:

|  | Per cent C | Per cent H |
|---|---|---|
| Calcd. for $C_9H_{10}O_2$ | 72.00 | 6.67 |
| Obtained | 71.98 | 6.68 |
|  | 71.96 | 6.80 |

*Preparation of potassium-1-alpha-furyl-3-ketopentane sulfonate*

| | Parts |
|---|---|
| Furfurylidenemethyl ethyl ketone (3.28 mols) | 429 |
| Potassium metabisulfite (1.64 mols) | 364 |
| Water | 500 |

A mixture of these substances is refluxed for about 2–3 hours in a suitable apparatus. The resulting mixture is filtered and the product is separated from the filtrate by the addition of sufficient ethanol. The solid product is filtered, washed with alcohol and dried. A yield of about 51% of the theoretical is obtained. The product does not melt at temperatures up to 250° C. For convenience this product will be designated as furfurylmethyl ethyl ketone sulfonate.

*Preparation of resin*

| | Parts |
|---|---|
| Furfurylmethyl ethyl ketone sulfonate (1 mol) | 270 |
| Water | 400 |
| Furfural (1.5 mols) | 152 |
| Hydrochloric acid | 70 |

The sulfonate is dissolved in the water and acid and the furfural is added to the resulting solution. The resulting mixture is agitated for about 75 minutes, thereby producing a clear solution. After standing about a day, a soft gel forms. This gel is ground to about 8 mesh, spread on trays, cured for about 4 hours at around 50 C. followed by an additional 4 hours at 100° C. The resulting resin is ground and screened. The final product has a capacity for the absorption of cations from water equivalent to about 11,800 grains of calcium carbonate per cubic foot of resin, and it has a packed density of about 28.8 pounds per cubic foot.

EXAMPLE 26

*Preparation of furfurylidene methyl furfurylidene ethyl ketone*

| | Parts |
|---|---|
| Methyl ethyl ketone (5 mols) | 360 |
| Sodium hydroxide (2.2 mols) | 86.5 |
| Alcohol | 1,000 |
| Furfural (11 mols) | 1,110 |

A mixture of the ketone and a solution of the sodium hydroxide in the water is placed in a reaction vessel provided with a mechanical agitator. The alcohol is added to give a clear solution after which the furfural is added slowly over a period of about 1 hour. During the addition of the furfural, the temperature rises to about 62° C. and the color becomes dark. The reacting mixture is agitated for about 5 hours and then permitted to stand for around 16 hours after which time the product has crystallized as a dark mass of solid material. This mass of material is broken up and washed with cold methanol. After drying the crystals a yield of about 65% of the theoretical is obtained. The crystals are light yellow having a melting point of 60–61° C. and after crystallization from aqueous alcohol show the following analysis:

|  | Per cent C | Per cent H |
|---|---|---|
| Calcd. for $C_{14}H_{12}O_3$ | 73.68 | 5.26 |
| Obtained | 72.87 | 5.12 |
|  | 72.65 | 4.99 |

Preparation of furfurylmethyl furfurylethyl ketone disulfonate

|  | Parts |
|---|---|
| Furfurylidene methyl furfurylidene ethyl ketone (2 mols) | 461 |
| Potassium metabisulfite (2 mols) | 449 |
| Water | 800 |

A mixture of these substances is refluxed in a suitable reaction vessel for about 1 hour and then maintained at approximately 85° C. for approximately 16 hours. A white crystalline solid deposits on cooling. The solid material is filtered and washed with acetone. The filtrate is poured into twice its volume of ethanol, thereby precipitating an additional quantity of the crystalline material. This material is washed with acetone and combined with the other crystals and dried at about 120° C. A yield of about 83% of the theoretical is obtained. The product does not melt at temperatures up to about 200° C.

Preparation of resin

|  | Parts |
|---|---|
| Furfurylmethyl furfurylethyl ketone disulfonate | 140 |
| Water | 250 |
| Furfural | 49 |
| Hydrochloric acid | 29 |

These substances are placed in a reaction vessel provided with an agitator in the order given. The resulting mixture is heated to about 40° C. and agitated for about 1 hour, thereby producing a black, homogeneous solution. The solution is allowed to stand for about 2 days during which time a gel forms. The gel is ground into small particles, spread on trays and cured for about 4 hours at 50° C. followed by an additional 4 hours at around 100° C. The cured resin is ground and screened in the usual manner to produce a material having a density of 24 pounds per cubic foot and a capacity for the absorption of cations from water equivalent to about 20,500 grains of calcium carbonate per cubic foot of resin.

EXAMPLE 27

Preparation of furfurylidenemethyl isobutyl ketone

|  | Parts |
|---|---|
| Methyl isobutyl ketone (5 mols) | 500 |
| Furfural (5 mols) | 505 |
| Sodium hydroxide (0.5 mols) | 20 |
| Water | 2,000 |
| Ethanol | 1,160 |

The sodium hydroxide is dissolved in the water and the ketone is mixed with the resulting solution in a reaction vessel provided with an agitator. The alcohol is added to give a clear solution after which the furfural is added slowly over a period of about 40 minutes during which time the temperature of the reacting mixture remains at about room temperature. The reacting mixture is agitated for about 1–2 hours after all of the furfural is added and then acidified by the addition of 10% sulfuric acid. The oily material which separates, is decanted and distilled under reduced pressure yielding about 83% of the theoretical amount of the product. The product is a light yellow liquid which boils at about 94° C. at around 1 mm. of mercury absolute pressure and it has the following analysis:

|  | Per cent C | Per cent H |
|---|---|---|
| Calcd. for $C_{11}H_{14}O_2$ | 74.15 | 7.86 |
| Obtained | 74.09 | 7.39 |
|  | 73.99 | 7.50 |

Preparation of potassium 1-alpha-furyl-3-keto-5-methylhexane sulfonate

|  | Parts |
|---|---|
| Furfurylidenemethyl isobutyl ketone (0.18 mols) | 31 |
| Potassium metabisulfite | 20 |
| Water | 75 |

A mixture of these substances is heated in a reaction vessel provided with a steam jacket and a mechanical agitator for about 2 hours. A clear solution is obtained after about 1 hour. When the reaction is complete about 80 parts of alcohol are added to the solution, thereby precipitating a fine crystalline solid having needle-like crystals. The crystals are filtered and washed with alcohol. The filtrate is poured into a large volume of alcohol, thereby precipitating an additional quantity of crystals. These crystals are filtered, washed with alcohol and combined with the first crop and dried. A yield of about 58% of the theoretical amount of the product which does not melt at temperatures up to 250° C. is obtained. For convenience this material will be designated as furfurylmethyl isobutyl ketone sulfonate. A sample which has been crystallized twice from alcohol has the following analysis:

|  | Per cent C | Per cent H | Per cent S |
|---|---|---|---|
| Calcd. for $C_{11}H_{15}O_5SK$ | 44.29 | 5.03 | 10.73 |
| Obtained | 43.74 | 4.65 | 10.82 |
|  | 43.78 | 4.79 | 10.92 |

Preparation of resin

|  | Parts |
|---|---|
| Furfurylmethyl isobutyl ketone sulfonate (0.5 mol) | 146 |
| Furfural (1 mol) | 101 |
| Water | 150 |
| Hydrochloric acid | 24 |

The sulfonate, water and acid are mixed together to form a clear solution after which the furfural is added. The resulting solution is allowed to stand at about room temperature for about 3 days during which time a rubbery gel forms. The gel is ground in small pieces and spread on trays and cured for about 4 hours at 50° C. followed by an additional 4 hours at about 100° C. After grinding and screening as usual the packed density is about 26.2 pounds per cubic foot and it exhibits a capacity for the absorption of cations from water equivalent to about 13,600 grains of calcium carbonate per cubic foot of resin.

EXAMPLE 28

Preparation of potassium 1-alpha-furyl-2-nitroethane sulfonate

|  | Parts |
|---|---|
| Furfurylidene nitromethane (0.3 mol) | 42 |
| Ethanol | 80 |
| Potassium metabisulfite (0.15 mol) | 33 |
| Water | 100 |

A solution of the furfurylidene nitromethane in the alcohol is heated in a reaction vessel provided with a steam jacket and a mechanical agitator. During the heating a solution of the potassium metabisulfite in the water is added slowly over a period of about 25 minutes. The reacting mixture is heated for an additional 1–2 hours. The resulting solution is poured into about 4 times its volume of acetone, thereby precipitating a brown solid material which is filtered.

*Preparation of resin*

| | Parts |
|---|---|
| Potassium 1-alpha-furyl-2-nitroethane sulfonate (0.1 mol) | 32 |
| Furfural (0.2 mol) | 24 |
| Sulfuric acid (10.6%) | 74 |

The sulfonate is dissolved in the acid and the furfural is added. After standing at room temperature for about 5 days, a gel forms. The gel is broken up into small pieces, spread on trays and cured for about 4 hours at 50° C. and for an additional 4 hours at around 100° C. The cured resin is ground and screened as usual, thereby providing a material having a packed density of 27.7 pounds per cubic foot and which has a capacity for the exchange of cations from water equivalent to about 17,900 grains of calcium carbonate per cubic foot of resin.

EXAMPLE 29

*Preparation of ethyl 3-potassiumsulfo-3-alpha-furylpropionate*

| | Parts |
|---|---|
| Ethyl furylacrylate (1 mol) | 174 |
| Potassium metabisulfite (0.5 mol) | 111 |
| Water | 200 |
| Ethylene glycol monoethyl ether | 136 |

These substances are mixed together in a reaction vessel provided with an agitator and a reflux condenser. The reacting mixture is refluxed for about 2 hours at the end of which time a small amount of solid material is present. The mixture is poured into about 1½ times its volume of acetone, thereby precipitating a fine white solid. This solid material is filtered and washed with acetone. The filtrate and washings are evaporated to dryness leaving an orange-colored residue which is suspended in acetone, filtered and washed with acetone. The white solid which remains on the filter is combined with the white solid obtained previously and dried. A yield of about 57% of the theoretical is obtained although analysis indicates that the product contains a small proportion of unreacted potassium metabisulfite.

*Preparation of resin*

| | Parts |
|---|---|
| Ethyl 3-potassiumsulfo-3-alpha-furylpropionate (0.7 mol) | 200 |
| Furfural (1 mol) | 106 |
| Sulfuric acid (10.6%) | 322 |

The propionate is dissolved in the acid by warming slightly, and the furfural is added. The resulting mixture is agitated to produce a clear solution. This solution is permitted to stand for about 3 days at about room temperature during which time a firm rubbery gel forms. The gel is ground to about 8 mesh, spread on trays and cured for about 4 hours at 50° C. followed by an additional 4 hours at approximately 100° C. The resulting resin is ground and screened as usual, thereby providing a material having a packed density of about 18.1 pounds per cubic foot and a capacity for the absorption of cations from water equivalent to about 23,000 grains of calcium carbonate per cubic foot of resin.

EXAMPLE 30

*Preparation of sodium-3-sodiumsulfo-3-alpha-furylpropionate*

| | Parts |
|---|---|
| 3-alpha-furylacrylic acid (1.5 mols) | 207 |
| Sodium sulfite (1.5 mols) | 189 |
| Water | 500 |

These substances are placed in a reaction vessel provided with a reflux condenser and a mechanical agitator. The reacting mixture is refluxed for about 3 hours. The resulting solution is concentrated by partially evaporating the solvent after which it is cooled, thereby precipitating a solid material which is filtered. This procedure of concentrating, precipitating and filtering the solid material is repeated several times until finally all of the solvent has been evaporated. The solid material thus obtained is dried at about 100° C. providing a yield of about 93% of the theoretical amount. The product does not melt at temperatures up to about 250° C.

*Preparation of resin*

| | Parts |
|---|---|
| Sodium 3-sodiumsulfo-3-alpha-furylpropionate (1 mol) | 264 |
| Furfural (1.5 mols) | 152 |
| Water | 500 |
| Sulfuric acid (1 mol) | 98 |

The propionate is dissolved in a solution of the acid in the water and the furfural is added. The resulting reacting mixture is agitated at room temperature for about 2 hours during which time the solution slowly darkens. The solution is permitted to stand for about 2 days at room temperature during which time a rubbery gel forms. The gel is broken up into small pieces and cured for about 4 hours at about 50° C. followed by an additional 4 hours at around 100° C. After grinding and screening the final product has a packed density of 13.1 pounds per cubic foot and it has a capacity for the absorption of cations from water equivalent to about 16,100 grains of calcium carbonate per cubic foot of resin.

EXAMPLE 31

*Preparation of 2-potassiumsulfo-2-alpha-furylpropionaldehyde*

| | Parts |
|---|---|
| Impure 2-alpha-furylacrolein | 80 |
| Potassium metabisulfite | 69 |
| Water | 100 |

The 2-alpha-furylacrolein contains a small proportion of impurities. A mixture of the substances tabulated is heated in a suitable reaction vessel surrounded by a steam bath and provided with an agitator. The reacting mixture is heated for about 5 hours and an additional 25 parts of potassium metabisulfite is added. The heating is continued for about 1 hour or more. A small amount of oil material which separated is decanted. The reaction mixture is cooled and a solid mass forms. The solid mass is broken up, filtered, washed with alcohol and dried. A yield of about 183 parts of product is obtained.

*Preparation of resin*

| | Parts |
|---|---|
| 2 potassiumsulfo-2-alpha-furylpropionaldehyde | 183 |
| Furfural | 127 |
| Sulfuric acid (10.6%) | 387 |

The aldehyde is dissolved in the acid by heating after which the resulting solution is cooled to about 30° C. The furfural is added and the reacting mixture allowed to stand for 3 days after which time a soft gel forms. The gel is broken up into small pieces, spread on trays and cured for about 4 hours at 50° C. and for an additional 4 hours at 100° C. The cured resin is ground and screened to produce a material having a packed density of 25.4 pounds per cubic foot and a capacity for the exchange of cations from water equivalent to about 20,500 grains of calcium carbonate per cubic foot of resin.

EXAMPLE 32

*Preparation of 2-cyano-3-potassiumsulfo-3-alpha-furylpropionamide*

| | Parts |
|---|---|
| Furfurylidene cyanacetamide (1 mol) | 162 |
| Potassium metabisulfite (0.5 mol) | 111 |
| Water | 100 |

A mixture of these substances is heated until a clear solution is obtained. The solution is refluxed for about 2 hours and then evaporated, leaving a light yellow solid as a residue. About 155 parts of slightly hydrated product is obtained.

*Preparation of resin*

| | Parts |
|---|---|
| 2 - cyano - 3 - potassiumsulfo - 3 - alpha-furylpropionamide (0.5 mol) | 155 |
| Water | 140 |
| Hydrochloric acid | 24 |
| Furfural (1 mol) | 101 |

The amide is dissolved in a solution of the water and acid and the furfural is added. The resulting solution is agitated for about 1 hour at room temperature and allowed to stand for about 5 days, during which time a soft gel forms. The gel is ground to small particles, spread on trays and cured for about 19 hours at 50° C. followed by an additional 4 hours at around 100° C. After the cured resin is ground and screened its density is about 26.8 pounds per cubic foot and it has a capacity for the extraction of cations from water equivalent to about 11,100 grains of calcium carbonate per cubic foot of resin.

Most of the sulfonates useful in accordance with my invention have the following general formula:

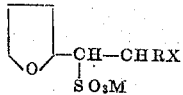

where X is an activating group as defined below, M is a metal, hydrogen or —H·NR₂R₃R₄ and where R, R₂, R₃, and R₄ are hydrogen or organic radicals. The R and X groups may include additional furyl groups and/or additional sulfonate groups. Any of the "R" groups in the above formula or in the succeeding formulae may be any desired organic radical since they do not form the essential characteristics of my compositions.

It is apparent that 1 mol of furfural may be reacted with 1 mol of a ketone or other active compound and the resulting compound reacted with 1 mol of a bisulfite or sulfurous acid. On the other hand, ketones, or other substances having two active groups either methyl or methylene, may be reacted with one or two mols of furfural and the resulting compound in turn reacted with 1 or 2 mols of a bisulfite or sulfurous acid. It may be desirable to employ an excess of the bisulfite or of the active compound in order to drive the reaction to completion.

The sulfonic acids used in the above examples are merely representative of those suitable for use in accordance with my invention. Various mixtures of the sulfonic acid may be used in place of the individual compounds if desirable.

One large group of sulfonic acids which may be employed are those formed by condensing furfural with a ketone and subsequently adding a bisulfite or sulfurous acid to the condensation product to produce a corresponding sulfonate or sulfonic acid. Ketones having an active methyl group or an active methylene group other than those employed in the previous examples may be used, e. g., methyl hexyl ketone, di-n-butyl ketone, etc. Furthermore, mixtures of the various ketones may be employed. The ketones are merely illustrative of a large number of substances which contain an active methyl or an active methylene group which may be condensed with furfural to yield an unsaturated compound to which a bisulfite may be added. Broadly speaking, the substances which may be reacted with furfural have the following general formula:

where R is hydrogen or an organic radical e. g., aliphatic, aromatic, hydroxyaromatic, furyl etc., and X is an activating group possessing a polar bond, e. g.,

—CONR'R', —COOR', —CN, NO₂, etc., where R' is hydrogen or an organic radical. The condensation of furfural with a compound of this type results in a substance of the following general formula:

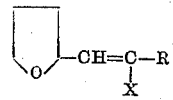

where R and X have the same significance as above. Vinylogs of these substances are included since it is known that the polar bond activates groups separated therefrom by one or more vinyl groups.

A few examples of suitable compounds containing an active methyl or methylene group are: chloracetic acid, crotonic acid, sorbic acid, propionic acid, butyric acid, succinic acid, malonic acid, lauric acid, phenylacetic acid, oxalacetic acid, 3,5-dinitro-o-toluic acid, and their esters (such as the methyl, ethyl, benzyl and phenyl esters) and their amides, crotonaldehyde, sorbic aldehyde, propionaldehyde, heptaldehyde, succinic aldehyde, phenylacetaldehyde, acetonitrile, propionitrile, lauronitrile, crotonic nitrile, succinonitrile, phenylacetonitrile, nitroethane, 1-nitropropane, 1 - nitrobutane, 1 - nitropropylene, 1-nitro-octylene-2, etc.

A compound of the foregoing type may be converted to the corresponding sulfonate by treatment with sulfur dioxide in a solvent medium including water or by treatment with a bisulfite. Suitable bisulfites include: sodium bisulfite, potassium bisulphite, ammonium bisulfite or any other desirable metal bisulfite such as calcium bisulfite. In general, the alkali metal bisulfites are preferred. The hydrogen sulfonates may be converted to the corresponding metal, ammonium or amine salts if desired examples of amines for such are: methyl amine, dimethyl amine, pyridine, triethyl amine, the mono-, di- and tri-ethanolamines, etc. Another method of producing the sulfonic acids of sulfonates is by treatment of the furfurylidene compounds with a hydrohalide followed by treatment with sodium sulfite or other metal sulfites.

Thus, for example, hydrogen chloride may be added to furfurylidene acetone and the resulting material treated with sodium sulfite. Still another type of sulfonate may be prepared by the condensation of furfural with a halogen substituted ketone such as chloracetone followed by treatment (1) with a hydrogen halide and then with a sulfite or (2) with a mixture of a bisulfite and a sulfite. The bisulfite or sulfite may be either a salt of an alkali metal, ammonia or any other desired metal or amine.

The sulfonates may be prepared from the furfurylidene compounds by reaction with bisulfite at temperatures ranging upwards from room temperature. In most instances, the reaction is advantageously carried out at a temperature between about 70° C. and about 130° C. although temperatures as low as room temperature may be employed. If sulfur dioxide be used the reaction is preferably carried out under pressure, e. g., 25–100 lbs./sq. in. and/or at relatively low temperature such as about 20° C. The time of reaction varies somewhat according to the compatability of the reactants. Thus, if a homogeneous solution of the reactants be employed, the reaction will usually be completed in from about one-half hour to about two hours. On the other hand, if the solution of the reactants is not homogeneous, 6–8 hours or even more may be required. Generally, water is employed as the solvent medium for the bisulfite and the furfurylidene compound, but if sufficient solubility is not obtained other solvents may be used. Mixtures of water and water-miscible organic solvents are especially suitable since the water is a good solvent for the bisulfite, while the organic solvent is a good solvent for the furfurylidene compound. Examples of suitable solvents are methanol, ethanol, propanol, isopropanol, tertiary butanol, dioxane, the lower alkyl mono-ethers of ethylene glycol and diethylene glycol, such as monoethyl ether of ethylene glycol, the mono-butyl ether of diethylene glycol, etc. Furthermore, inert ketones may be employed as solvents for the reactants in the production of the sulfonates. In some instances it may be desirable to employ active ketones as intermediates in the preparation of the sulfonates. Thus, the bisulfite may be added to an active ketone and this in turn may react with the furfurylidene compound, the former giving up the bisulfite to the latter.

Other sulfonic acids or sulfonates which may be used in accordance with my invention may be obtained by condensing a sulfonic acid with a substance containing a furan ring as a substituent. Thus, for example, the sulfonic acid of hydroxybenzaldehyde could be condensed with mono-furfurylidene acetone. The resulting mono-sulfonic acid could be treated with a bisulfite or with sulfur dioxide in water to produce a polysulfonic acid or polysulfonate. Either the mono- or poly-sulfonic compounds could be resinified with furfural to produce a cation active material. It is to be noted from the foregoing examples that I may use either the sulfonic acids of sulfonates of mono- or difurfurylidene compounds.

It is preferable that the sulfonates which are suitable for the purposes of my invention should not contain any basic amino group because the latter might tend to form internal salts with the sulfonic group and thereby reduce the cation activity of the resin particularly if the resin is to be used as a cation exchanger where, for example, alkaline earth metals are exchanged for sodium. However, my invention is not limited to the exclusion of amino groups and if desired they may be present.

My sulfonic acids are preferably resinified with furfural although part of the furfural may be replaced with other aldehydes, particularly formaldehyde, a polymer of formaldehyde or a substance yielding formaldehyde. Other aldehydes which may be used include acetaldehyde, butaldehyde, heptaldehyde, crotonaldehyde, arolein, benzaldehyde, etc. I have found that products prepared with furfural alone or with furfural mixed with not more than an equimolecular proportion of formaldehyde are superior to those prepared with other aldehydes or other proportions thereof. The molal ratio of aldehyde to sulfonate may be varied depending on the desired properties. Usually, molal ratios of aldehyde to sulfonate between about 1:1 and 3:1 are preferred. The molal ration is adjusted within the aforementioned range, taking into consideration the facts that swelling and solubility increase toward the low end of the range, while activity decreases toward the high end of the range.

The sulfonates may be condensed with furfural, formalin, or other aldehyde under acid, neutral or alkaline conditions followed by acid gelation as illustrated in the foregoing examples.

While gelation of my sulfonate-aldehyde condensation products occurs slowly without the use of acid, from a practical point of view either an acid or an acid salt should be used to induce gelation. For this purpose, strong mineral acids such as sulfuric acid, hydrochloric acid or phosphoric acid are convenient and effective. Other substances which may be used are acid salts, e. g., ferric sulfate, ferric chloride, boron trifluoride, mixtures of the mineral acids such as hydrochloric acid with any of the foregoing salts, etc. The amount of acid employed varies somewhat with different acids. Generally, the molal ration of acid to sulfonate should be between about 1:4 and 3:1, preferably about 1.5:1.

After gelation of the sulfonate-aldehyde condensation product, the gels are preferably aged at room temperature until sufficiently hard to be ground into small particles. The gel is ground to any desired size, e. g., to pass through an 8–12 mesh screen. The ground gel is dried and cured by heating in any suitable manner. The drying and curing process may be carried out at temperatures between about 15° C. and about 200° C. The time required will, of course, vary somewhat with temperature. Generally, from about one-half hour to about twenty-four hours is sufficient. At least part of the drying and curing operation is preferably carried out at a temperature of at least 100° C. and preferably at a temperature of about 130° C. It has been found that a more insoluble product is obtained if the resins are cured at about 130° C. Such products do not throw color, whereas products cured at lower temperatures may, upon long contact, very slightly color the solutions which are being treated.

If desired, other materials which contribute to cation activity and which react with aldehydes other than the furyl sulfonic acids, may be included in my resinous compositions, e. g., phenols, polyhydric phenols, sulfonated mono- and polyhydric phenols, other aromatic sulfonic acids, etc. Relatively inert aldehyde reactive materials may also be included, e. g., urea, dicyandiamide, the aminotriazines such as melamine, the sulfonamides, etc.

My resinous materials may be used alone or in admixture with other cation-active materials. Furthermore, my resins may be applied before gelation to a suitable carrier such as diatomaceous earth, clays, charcoal, etc. In this way, the active resin is spread on the surface of a relatively inert material and this enables one to employ a smaller quantity of resin than otherwise to obtain the same active area.

Resinous material prepared according to my invention are useful in the removal of cations from fluid media, especially aqueous solutions. The resins may be used in the hydrogen-activated form to remove cations from solutions of bases. My resinous cation-active materials may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions are dilute acid solutions or dilute salt solutions, e. g., about 0.2%–10% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than about 1 part of resin in 1,000 parts of water when passed through a bed of resin (after the first cycle comprising an activation, exhaustion and reactivation of the resin).

My processes of purifying fluid media are applicable, not only to water purification and to the purification of sugar solutions as illustrated in Examples 1 and 2, but also to the removal of heavy metal cations from foods, beverages and pharmaceutical products, for the removal of basic dyes from fluid media, for the removal of valuable cations from dilute solutions, e. g., gold from sea water, chromium from chrome tanning liquors, silver from photographic baths, etc. Another important application of my purification processes is in the absorption or adsorption of gases such as ammonia triethylamine, methylamine, etc. from fluid media either dissolved in a liquid or from vapors. Such vapors may consist almost entirely of the gas to be absorbed or they may contain a relatively inert gas such as air, nitrogen, carbon dioxide, etc.

Obviously many variations in the processes and compositions described above may be made without departing from the spirit and scope of the invention as defined in the appended claims.

I claim:

1. A process of removing cations from fluid media which comprises treating a fluid containing cations with an alpha-furyl substituted organic sulfonate reacted with and insolubilized by an aldehyde.

2. A process of removing cations from fluid media which comprises treating a fluid containing cations with an alpha-furyl substituted sulfonates free of basic amino groups reacted with and insolubilized by at least one aldehyde.

3. A process of removing cations from fluid media which comprises treating a fluid containing cations with an alpha-furyl substituted sulfonate reacted with and insolubilized by at least one aldehyde including furfural.

4. A process of removing cations from fluid media which comprises treating a fluid containing cations with a 1-alpha-furyl ketone sulfonate reacted with and insolubilized by at least one aldehyde including furfural.

5. A process of removing cations from fluid media which comprises treating a fluid containing cations with an insolubilized condensation of at least one aldehyde including furfural and a 1,5-di-alpha-furyl-3-ketopentane disulfonate-1,5.

6. A process of removing cations from fluid media which comprises treating a fluid containing cations with an insolubilized condensation product of at least one aldehyde including furfural and a 1-alpha-furyl-3-ketobutane sulfonate.

7. A process of removing cations from fluid media which comprises treating a fluid containing cations with an insolubilized condensation product of a 1-alpha-furyl ketone sulfonate and a mixture of aldehydes including furfural and formaldehyde.

JACK T. THURSTON.